United States Patent [19]
Beesley

[11] Patent Number: 5,533,707
[45] Date of Patent: Jul. 9, 1996

[54] CHECK VALVE WITH INTERNAL LONGITUDINALLY DISPLACEABLE SLEEVE VALVE

[75] Inventor: Daryl S. Beesley, South Lyon, Mich.

[73] Assignee: Flexon, Inc., Ferndale, Mich.

[21] Appl. No.: 401,187

[22] Filed: Mar. 9, 1995

[51] Int. Cl.⁶ ................................................ F16K 31/02
[52] U.S. Cl. ............................ 251/129.15; 251/129.21
[58] Field of Search .................... 251/129.01, 129.15, 251/129.21; 137/511, 515, 522, 540, 543.17, 543.19

[56] References Cited

U.S. PATENT DOCUMENTS

| | | |
|---|---|---|
| 2,876,753 | 3/1959 | Chandler . |
| 4,385,491 | 5/1983 | Sakurai et al. . |
| 4,437,645 | 3/1984 | Nomura et al. . |
| 4,504,039 | 3/1985 | Akagi . |
| 4,535,815 | 8/1985 | Ohumi et al. . |
| 4,813,647 | 3/1989 | Yagi et al. . |
| 4,942,849 | 7/1990 | Shelton ..................... 251/129.21 X |
| 5,054,742 | 10/1991 | Nicolaisen . |

*Primary Examiner*—Kevin Lee
*Attorney, Agent, or Firm*—Young & Basile

[57] ABSTRACT

A check valve selectively prevents and allows fluid flow between an inlet and an outlet. An elongated housing has an internal fluid passage extending between the inlet and the outlet. The passage is defined in part by at least one sidewall extending parallel to a longitudinal axis of the housing. At least one stationary intermediate aperture is disposed between the inlet and the outlet. A reciprocal member is slidably received within the passage and carries a valve seat engageable with the housing to substantially close the intermediate aperture when in the first position and to substantially open the intermediate aperture when in a second position. The fluid flow passes straight through the reciprocal member along a linear path when the valve seat is moved away from the intermediate aperture. The check valve can be placed between an air pump and a manifold to prevent backflow of fluid from the manifold to the air pump.

21 Claims, 4 Drawing Sheets

CHECK VALVE WITH INTERNAL LONGITUDINALLY DISPLACEABLE SLEEVE VALVE

FIELD OF THE INVENTION

The present invention relates to an active check valve for placement between an air pump and a manifold to prevent back flow of compressed gases from the manifold to the pump, and in particular, to an electrically driven flow control valve assembly for regulating the flow of a fluid, such as air, between an inlet and an outlet via a slide valve driven by an electromagnetically actuated motor, such as a solenoid.

BACKGROUND OF THE INVENTION

Electromagnetic solenoid type flow control valves are generally known in the art. Conventional solenoid actuated valve devices have been proposed which use a linear motor of the movable coil type and a valve means. The linear motor includes a core, a bobbin slidably mounted on the core, a solenoid coil wound on the bobbin, permanent magnets with the magnetic flux of each magnet intersecting the winding of the solenoid coil at right angles and a yoke or body forming a magnetic circuit with the core. The valve means in general includes a sliding valve member which is slidable with the bobbin on the core in response to the electric current going through the solenoid coil to thereby proportionally control openings formed in the core between an inlet port and an outlet port.

In such conventional solenoid actuated valve devices, when the solenoid coil receives no electric current, the sliding valve member is always biased by means of a pair of springs in a direction so that the sliding valve member will completely open or completely close the openings to thereby interrupt or fully establish the fluid communication between the inlet and outlet ports. Therefore, in order to cause the sliding valve to move to the full extent in the opposite direction from which it is normally biased, a large magnetic or exciting force must be generated by the application of electric current to the solenoid coil.

In a known electromagnetic solenoid type flow control valve, the valve includes a valve member slidable along the outer surface of the core to cover the valve ports. When the solenoid coil is energized, the bobbin and the valve member are displaced against the influence of the springs to open the valve ports and to cover the valve ports.

In a known solenoid actuated valve device, a core is supported by a body and a cover member for axial movement relative thereto. While the solenoid coil receives no electric current, the bobbin, having a valve portion, is maintained in its original position, therefore the air at the inlet port is transmitted to the outlet port by means of the first opening. When the solenoid coil receives a positive electric current, the bobbin is moved to the right in proportion to the strength of the electric current whereby the valve portion proportionally opens the second opening means to thereby increase the fluid communication between the inlet and outlet ports. When the solenoid coil receives a negative electric current, the bobbin is moved to the left in proportion to the strength of the electric current whereby the valve portion proportionally closes the first opening to thereby restrict the fluid communication between the inlet and outlet ports, respectively.

A known slide valve is driven along a hollow core by a linear motor to control the degree of communication between an inlet and an outlet port through the hollow interior of the iron core. A bobbin-type slide valve is slidably disposed on the iron core and fixedly secured to a bobbin holder. The bobbin holder is biased by means of two springs. An electromagnetic coil is wound on the slide valve through the intermediary of the bobbin holder and a pair of permanent magnets are provided within the valve assembly and arranged in such a manner that the magnet flux produced thereby passes through the windings of the electromagnetic coil at a right angle.

An engine mixture control system is known for controlling primary and secondary air-fuel mixtures. Around the outer cylindrical surface of the support pipe there is fitted a slide sleeve of a generally hollow cylindrical form. The inner cylindrical surface of the slide sleeve closely conforms to the outer cylindrical surface of the support pipe, so that as the slide sleeve moves upwards and downwards with respect to the support pipe, the upper edge of the slide sleeve moves across the valve port and thus regulates the effective open area of the valve port.

In a known manually controllable automobile governor, a valve element is mounted on a body member with an opening extending through the body portion of the valve element. The body member closely fits within the passage in slidable relation therein to substantially prevent liquid flow between the passage wall and the body portion. An opening extends transversely through the valve element and is of a size sufficient to be able to carry a flow of liquid fuel equal to the flow capabilities of the opening in the valve element and the inlet passage of the body member. A compression spring engages the end of the valve element to normally close the transverse opening of the valve member. A coil or solenoid is wound circumferentially around and engaged with the body member. When the solenoid is energized, the valve element moves in opposition to the spring thereby opening the passage to allow greater fuel flow than is possible through the restricted opening.

While each of these previously known valve configurations appears to be capable of adequately performing its intended function, the configurations disclosed are overly complex and difficult to manufacture in a cost-effective manner. It is therefore desirable in the present invention to provide a simplified electromagnetically driven flow control valve assembly that is easier to manufacture in a cost-effective manner. It is further desirable to provide a simple construction valve to check flow when the valve assembly is in the closed condition.

SUMMARY OF THE INVENTION

The present invention relates to an active check valve for placement between an air pump and an exhaust manifold. The primary function of the valve is to prevent unacceptable amounts of back flow of exhaust gases from the exhaust manifold to the pump. The valve is normally closed and substantially prevents flow in the closed condition. The valve will open in response to an electric signal. An electric signal to the air pump for delivering positive air flow is only provided when the valve has opened. Preferably, once opened, the valve is switched to a lower energy consumption hold open state to reduce maximum current flow requirements when starting the air pump.

The valve includes an outer housing adapted to receive a solenoid adjacent one end thereof. An internal wall or tube extends longitudinally along the centerline of the housing. In the first embodiment, the internal tubing has radially opening longitudinally extending apertures through a sidewall thereof. In a second embodiment, radially opening longitudinally extending apertures are formed in an intermediate wall in the housing at an end opposite from the solenoid. A movable internal closure sleeve slidably engages within the wall or tube and is biased into a closed position blocking off the radially opening apertures by a spring. Energizing the solenoid causes the sleeve to move within the housing against the urgings of the spring to open the outlet apertures in the housing to allow fluid flow therethrough.

In the first embodiment of the present invention, a check valve preferably includes a housing with an inlet and an outlet. An elongated wall or tube extends longitudinally within the housing from the inlet and communicates with fluid flow from the inlet. The tube has an end cap opposite from the inlet closing the tube. The tube also includes at least one longitudinally extending radially opening aperture in a sidewall of the tube adjacent the end cap. An inner sleeve is slidably received within the tube for longitudinal movement therein between a first position closing the longitudinally extending, radially opening aperture, thereby blocking fluid flow between the inlet and outlet of the housing and a second position opening the longitudinally extending, radially opening aperture to fluid flow between the inlet and outlet of the housing. Biasing means normally urges the sleeve toward one of the first and second positions. Preferably, the sleeve is urged toward the first position to prevent fluid flow between the inlet and outlet of the housing. Actuating means drives the sleeve toward the other of the first and second positions against the urgings of the biasing means.

In a second or preferred embodiment of the present invention, a check valve is provided for selectively preventing and allowing flow of fluid from an inlet to an outlet. The check valve includes a housing having an inlet and an outlet, and at least one intermediate longitudinally extending aperture is disposed between the inlet and the outlet. An elongated longitudinally extending passage is defined by at least one wall extending parallel to a longitudinal axis within the housing. The elongated passage extends within the housing from the inlet and communicates with the inlet. An elongated inner sleeve is slidably received within the passage for longitudinal movement therein between a first position closing the at least one aperture to fluid flow between the inlet and the outlet, and a second position opening the aperture to fluid flow between the inlet and the outlet. Biasing means normally urges the sleeve toward one of the first and second positions. Actuating means drives the sleeve toward the other of the first and second positions against the urging of the biasing means. In this, the preferred embodiment, the intermediate aperture and valve seat is formed with a high angle of attack valve to reduce the effect of pressure and vacuum, thereby eliminating the need for bleed and passive valves commonly required in current systems. At least one outlet port is formed in a longitudinally extending wall connected to the housing disposed between the housing inlet and outlet. A valve seat connected to the longitudinally slidable sleeve engages the housing seat surrounding the outlet port to seal the outlet port eliminating any fluid flow therethrough when in the closed position. When the sleeve moves to draw the valve seat away from the housing seat, fluid flow is permitted through the outlet port between the housing inlet and outlet. Preferably, the sleeve moves in a direction toward the open position opposite from the direction of fluid flow between the inlet and outlet of the housing.

The present invention also addresses the concern of exhaust manifold cross talk on V6 and V8 engines that can cause excessive heating of current system components. In the preferred embodiment of the present invention, the fluid flow is split to separate outlets through two separate outlet ports in the housing. This effectively acts as two active check valves with one common inlet port, thereby reducing total system weight, amperage draw, added wiring and plumbing. This preferred configuration as disclosed in the second embodiment eliminates fluid blow by around the check valve that occurs in the first embodiment and which may be undesirable in certain applications.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED AND ALTERNATIVE EMBODIMENTS

Figure 1:
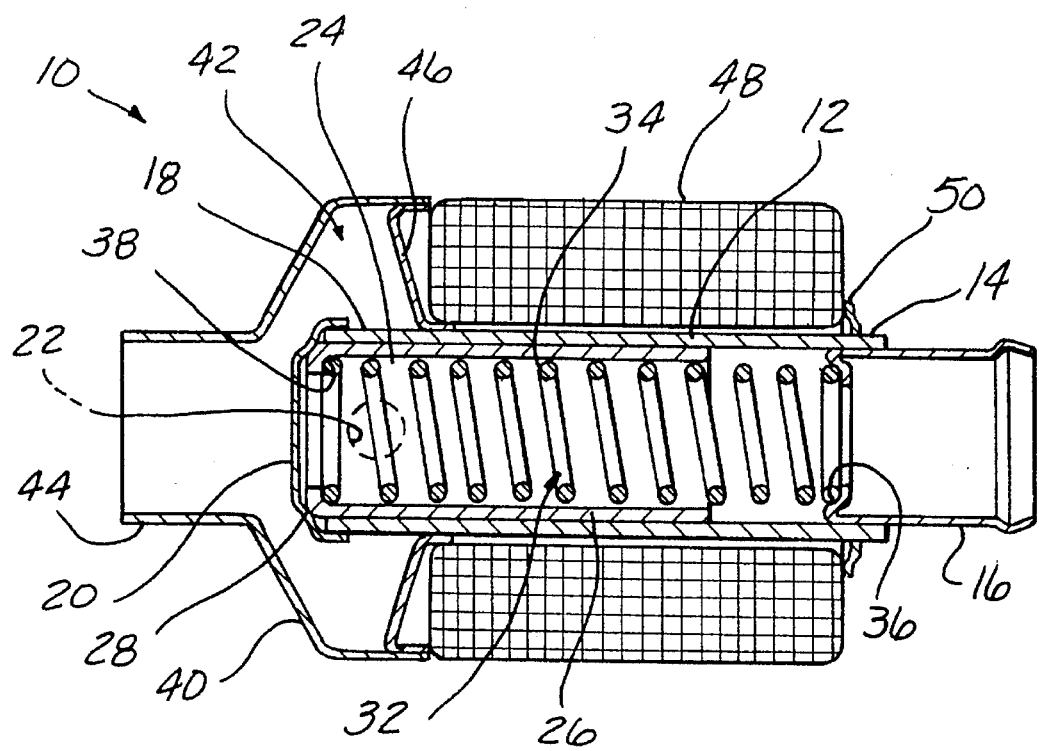
FIG. 1 is a cross-sectional view of a check valve according to the first embodiment of the present invention shown in the closed position.

A cross-sectional view of a check valve 10 according to the first embodiment of the present invention is shown in the closed position in FIG. 1. The check valve 10 preferably includes an elongated longitudinally extending wall or tube 12 having a first end 14 with an inlet connector 16 attached thereto or formed thereon. The elongated tube 12 preferably includes a second end 18 having an end cap 20 closing the elongated tube 12 opposite from the inlet connector 16. The elongated tube 12 also includes at least one longitudinally extending radially opening aperture 22 in a sidewall 24 of the elongated tube adjacent the end cap 20. The inner sidewall 24 of the elongated tube 12 defining a sleeve seat for the check valve 10.

Figure 2:
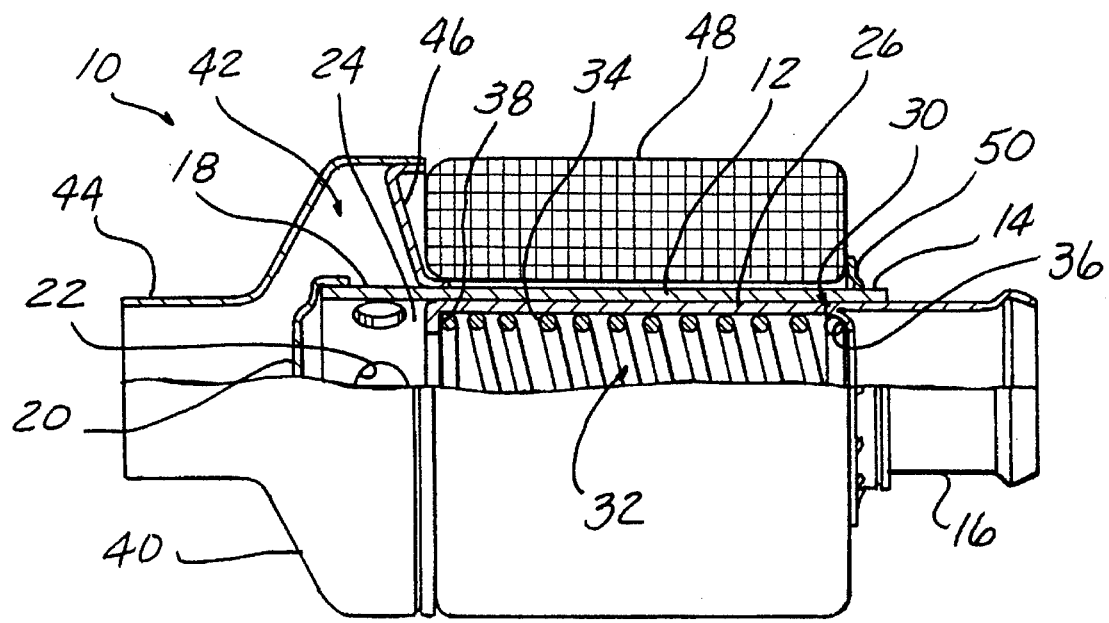
FIG. 2 is a partial cross-sectional view of the check valve according to the first embodiment of the present invention shown with the valve in an open condition.

An inner sleeve 26 is slidably received within the elongated tube for longitudinal movement therein from a first position closing the at least one aperture 22, as illustrated in FIG. 1, to prevent fluid flow between the inlet and the apertures 22, and a second position opening the at least one aperture 22 to fluid flow between the inlet and the apertures 22, as illustrated in FIG. 2. The inner sleeve 26 defining a sleeve valve. The first position of the inner sleeve 26, as illustrated in FIG. 1, is defined by the inner sleeve 26 abutting against the end cap 20 as shown at 28, also defining a first end limit of movement of the inner sleeve 26. The inner sleeve 26 is movable to a second end limit of movement within the elongated tube 12, as shown in FIG. 2, to abut against the inlet connector 16 as shown at 30. When in the first position, the inner sleeve or sleeve valve covers and closes fluid communication between the inlet 16 and the at least one longitudinally extending, radially opening aperture 22. When in the second position, the inner sleeve allows fluid communication from the inlet 16 through the inner sleeve 26 and out of the at least one longitudinally extending, radially opening aperture 22, as shown in FIG. 2.

Biasing means 32 normally urges the inner sleeve 26 toward one of the first and second positions. The biasing means 32 may include a spring 34 having a first end supported by a first spring seat 36 formed on or connected to the inlet connector 16. A second spring seat 38 is formed on or connected to the inner sleeve 26. The spring 34 is disposed between the first and second spring seats, 36 and 38 respectively, to bias the inner sleeve 26 toward one of the first and second end limits of movement or positions, 28 and 30 respectively. As illustrated in FIG. 1, the inner sleeve 26 is biased toward the first end limit of movement 28 so that the valve 10 is in a closed position normally.

A housing 40 is connected to an external surface of the elongated tube 12 to enclose the at least one longitudinally extending, radially opening aperture 22 and to define a buffer chamber 42 disposed about the aperture 22. An outlet connector 44 is formed on or connected to the housing 40. The inlet connector 16 is particularly adapted to receive flow from an air pump for passage of compressed air through the elongated tube 12, inner sleeve 26 and passage out of aperture 22 when said inner sleeve is in the second end limit of movement 30, as illustrated in FIG. 2, for passage into the buffer chamber 42 defined by housing 40 for subsequent passage out of the outlet connector 44 to a manifold assembly. The housing 40 may include a radially extending base wall 46. The base wall 46 defining a stop or collar for limiting longitudinal movement of coil 48 in one direction. The coil 48 being disposed around the external surface of the elongated tube 12. A collar 50 being disposed on an opposite end of the coil 48 to prevent longitudinal movement of the coil along the elongated tube in the direction opposite from the base wall 46. The collar 50 acting as a coil retainer clip.

Preferably, the elongated tube 12 or sleeve seat, end cap 20, including the first end limit of movement seat 28, and housing 40, including the radially extending base wall 46 are constructed of 304 stainless steel. The sleeve valve or inner sleeve 26 slidably received within the elongated tube 12 is preferably constructed of coated 1015 steel. The coil 48 is preferably 12.9 ohms, 1.3 amps at 17.2 volts direct current.

Figure 3:
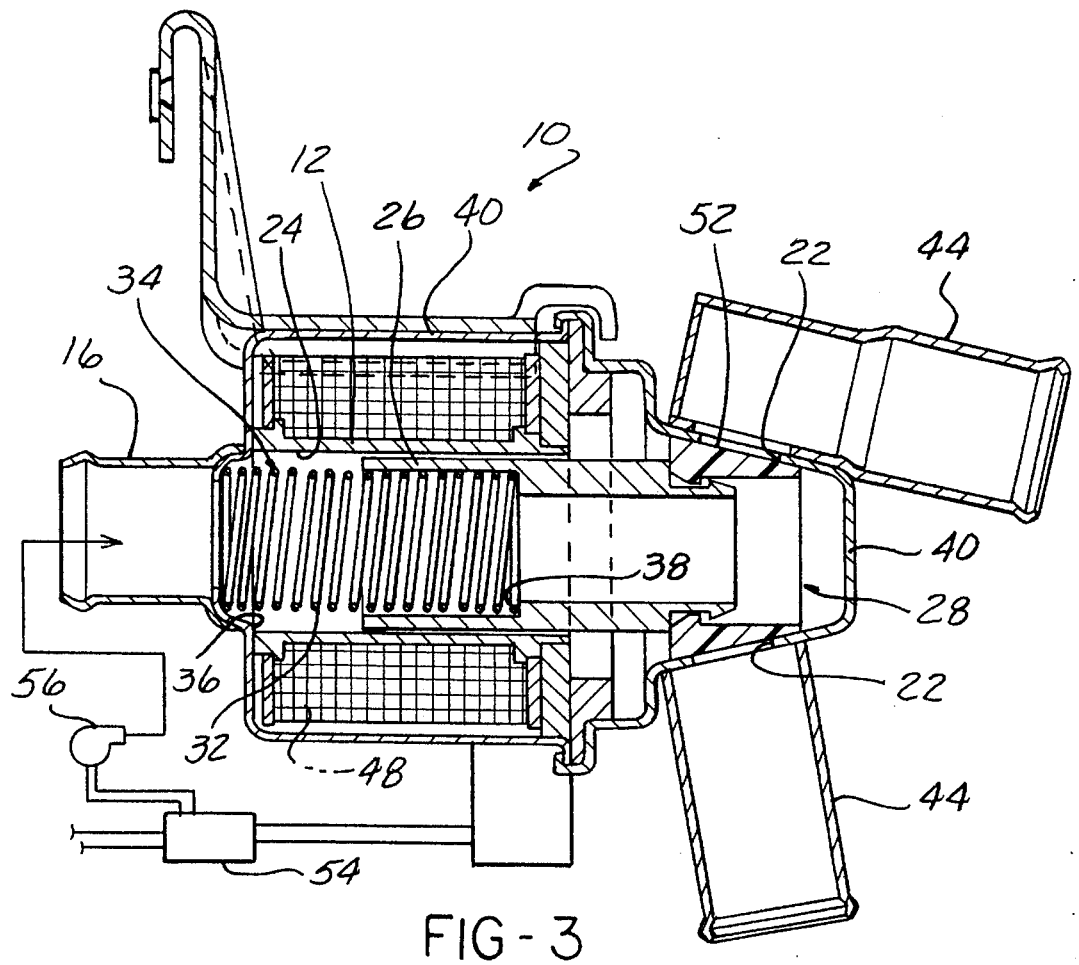
FIG. 3 is a cross-sectional view of a preferred second embodiment of a check valve according to the present invention shown in the closed position.
Figure 4:
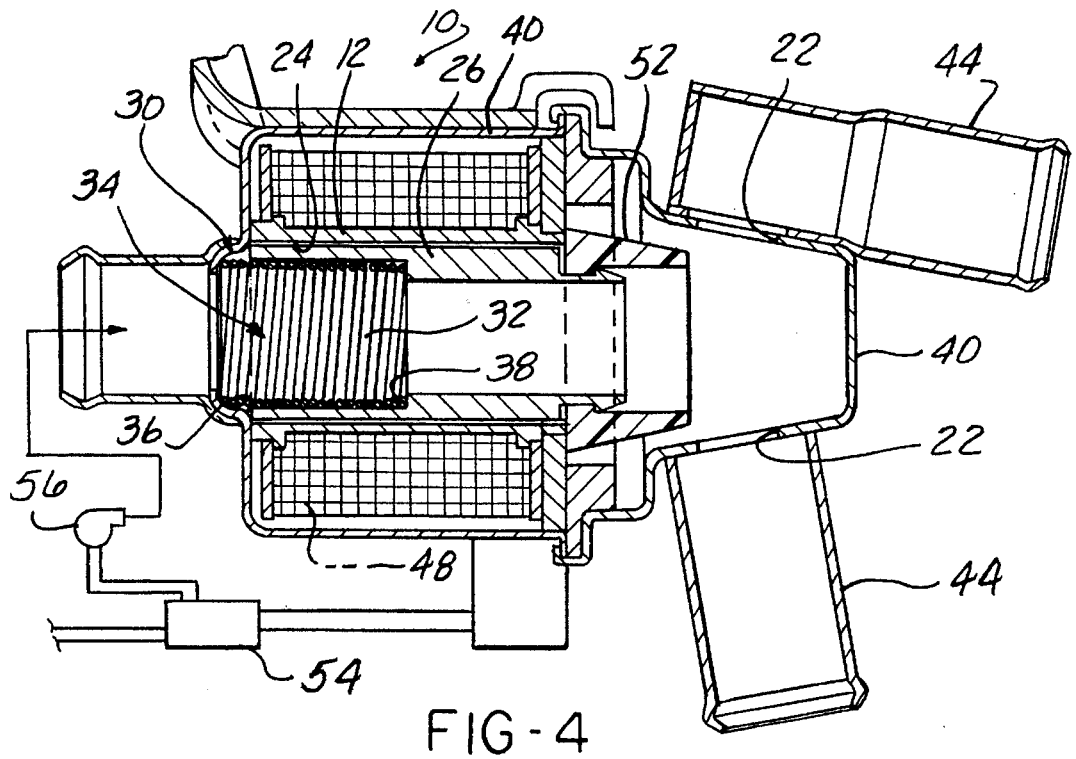
FIG. 4 is a cross-sectional view of the check valve according to the preferred second embodiment of the present invention shown with the valve in an open condition.

Referring now to FIGS. 3 and 4, a preferred embodiment of the present invention is illustrated. The preferred second embodiment includes a check valve 10 for selectively preventing and allowing fluid flow between an inlet connector 16 and an outlet connector 44. The check valve 10 includes a passage, such as elongated tube 12, defined in part by at least one sidewall 24 extending parallel to a longitudinal axis of the elongated housing 40. At least one stationary intermediate, longitudinally extending, radially opening aperture 22 is disposed between the inlet connector 16 and the outlet connector 44. Reciprocal means, such as inner sleeve 26, is slidably received within the portion of the passage defined by the sidewall 24. The reciprocal means carries a valve seat 52 engageable with the housing 40 to substantially close the intermediate aperture 22 when in a first position or first end limit of movement 28, and to substantially open the intermediate aperture 22 when in a second position or second end limit of movement 30. The fluid flow passes straight through the reciprocal means along a linear path when the valve seat 52 is moved away from the intermediate aperture 22 toward the second end limit of movement 30.

The check valve 10 also includes a first spring seat 36 connected to the sidewall 24 of the passage. A second spring seat 38 is connected to the reciprocal means. Biasing means 32, such as a valve return spring 34, is disposed within the passage having a first end abutting against the first spring seat 36 and a second end abutting against the second spring seat 38 for normally urging the reciprocal means toward one of the first and second positions, 28 and 30 respectively. Actuating means, such as a solenoid coil 48, is disposed with windings around the passage for urging the reciprocal means toward the other of the first and second positions, 28 and 30 respectively, against the urgings of the biasing means 32, such as valve return spring 34, in response to current flow through the actuating means, such as solenoid coil 48. The solenoid coil 48 acts on the reciprocating means, such as a metallic inner sleeve 26, by creating a magnetic field in response to application of power to the coil 48 to cause the metallic inner sleeve 26 to move in opposition to the urgings of the valve return spring 34 to open the fluid flow passage. In the preferred embodiment of the present invention as illustrated in FIGS. 3 and 4, the valve seat 52 has a high angle of attack to reduce pressure and vacuum effects on operation of the reciprocal means.

Control means 54 prevents application of power to a fluid pump means 56 until the reciprocal means is in the second position. When the reciprocal means is in the second position, the control means 54 reduces the current flowing to the reciprocal means prior to applying power to the fluid pump means 56. The starting of an air pump can reduce available power to 9 volts direct current. Therefore, the minimum functional voltage for the check valve 10 has been set at 9 volts direct current. The check valve 10 according to the present invention will continue to open at less than 8.5 volts direct current at 21° C., but will not have the same performance as at 11 volts direct current. To increase the performance, the coil has been selected for more pull at lower voltages. The control means 54, or system control module, has been added to remove the reduced voltage effect of the air pump. When power is applied to the control means 54, the active check valve 10 according to the present invention is opened. This removes the reduced voltage effect of the air pump. Within a few milliseconds, the check valve 10 is fully opened and it magnetically triggers the control means 54. At this point, the control means 54 performs two functions; first setting the check valve 10 in a reduced current mode, and second starting the air pump in that order. When power is removed from the control means 54, the active check valve 10 closes and the air pump spins down. The reduced current mode of the check valve 10 cuts the total system power requirements by more than 1.5 amps. As with most electrical devices, self-heating can be a problem. Even with a low amperage coil, the high watt to surface area ratio can cause self-heating above the maximum desired operating temperature. This is typically tested at 17.2 volts direct current for 45 minutes. When in the reduced current mode, the check valve 10 according to the present invention has a watt to surface area ratio that is reduced to less than ¼ of that ratio for the full current mode. The control means 54 prevents starting the fluid pump means 56 if the check valve 10 does not open, eliminating the possibility of the fluid pump means 56 burning out from a dead head condition. With the control means 54, the pump is protected, since the control means 54 will not power the fluid pump means 56 until the check valve 10 is open.

By way of example, and not limitation, experimental testing with check valves 10 without control modules require a minimum of 0.9 amps to open the check valve 10, but only 0.15 amps to keep the check valve 10 open. When power is removed from the fluid pump means 56, the fluid pump means 56 becomes a generator, and the check valve 10 stays open until the fluid pump means 56 is almost spun down. Low line pressure between the fluid pump means 56 and the check valve 10 can allow exhaust contaminants to enter the pump which is undesirable.

After adding the control means 54, when the power is removed, the control means 54 has the check valve 10 in a reduced current mode requiring approximately 0.34 amps. In this reduced current mode, the check valve 10 will close much sooner than it would if held open by the full 0.9 amps typically previously applied. The present invention also reduces costs in material and labor. By providing the control means 54 with connections for both the check valve 10 and the fluid pump means 56, only one cable with two wires, one positive and one negative, is required for power.

Figure 5:
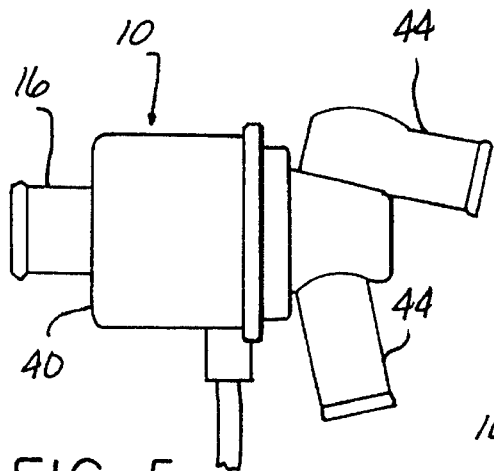
FIG. 5 is a side view of the check valve according to the second embodiment of the present invention as illustrated in FIGS. 3 and 4.
Figure 6:
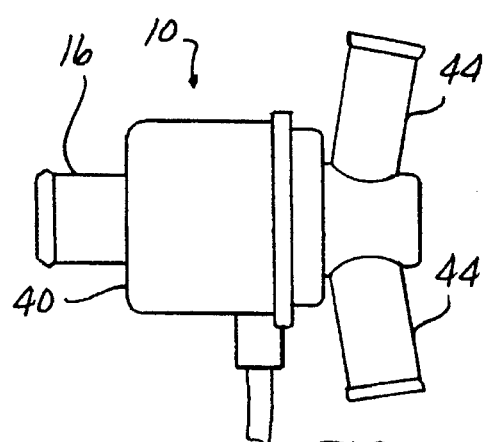
FIG. 6 is a side view of the check valve according to the second embodiment of the present invention with an alternative outlet connector configuration.
Figure 7:
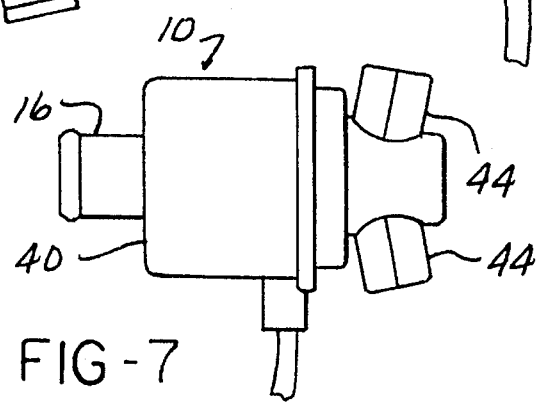
FIG. 7 is a side view of the check valve according to the second embodiment of the present invention with an alternative end effect for the outlet connectors.

FIG. 5 is a side view of the check valve according to the second embodiment of the present invention having barbed tube end effects for the inlet 16 and outlets 44. The barbed tube end effects for the inlets and the outlets are suitable for receiving rubber hose clamp connectors (not shown). FIG. 6 is a side view of the check valve according to the second embodiment of the present invention with barbed tube end effects for the inlet 16 and the outlets 44. In addition, FIG. 6 illustrates an alternative configuration for the outlets 44 from the outlets 44 in FIG. 5 which are generally disposed at a 90° angle with respect to one another, where the outlets 44 in FIG. 6 are disposed generally 180° with respect to one another. FIG. 7 is a side view of the check valve according to the second embodiment of the present invention with a barbed tube end effect for the inlet 16 and with inverted flare end effects for the outlets 44. The inverted flare end effect is suitable for welded connections and may also be used on the inlet 16 if desired as illustrated in FIGS. 1 and 2. The inverted flare end effects for the outlets 44 may also be provided in the configuration of the outlets 44 as illustrated in FIG. 5 if desired.

Figure 8:
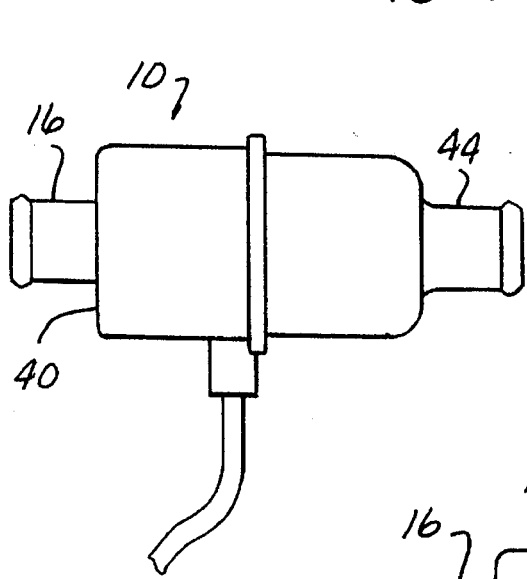
FIG. 8 is a side view of the check valve according to the first embodiment of the present invention as illustrated in FIGS. 1 and 2 with a straight flow through configuration.
Figure 9:
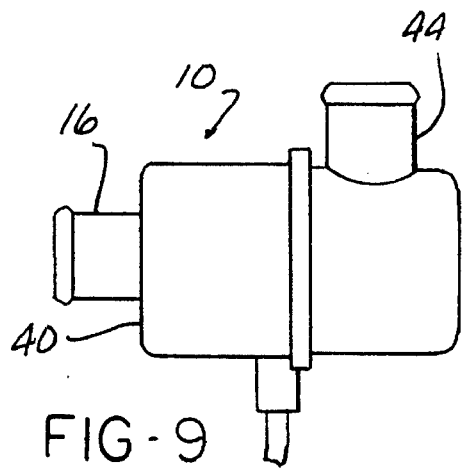
FIG. 9 is a side view of the check valve according to the first embodiment of the present invention with an alternative outlet connector configuration providing a 90° flow path.
Figure 10:
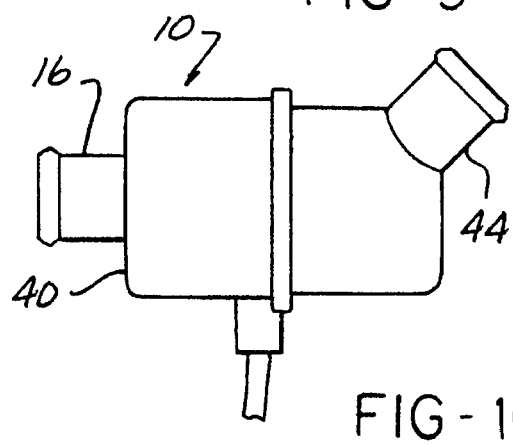
FIG. 10 is a side view of the check valve according to the first embodiment of the present invention with an alternative configuration for the outlet connector providing a 135° flow path.
Figure 11:
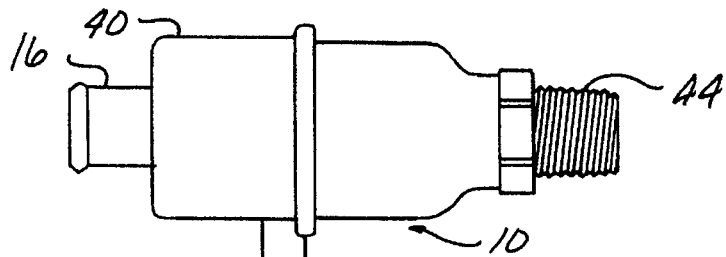
FIG. 11 is a side view of the check valve according to the first embodiment of the present invention with an alternative end effect for the outlet connector.
Figure 12:
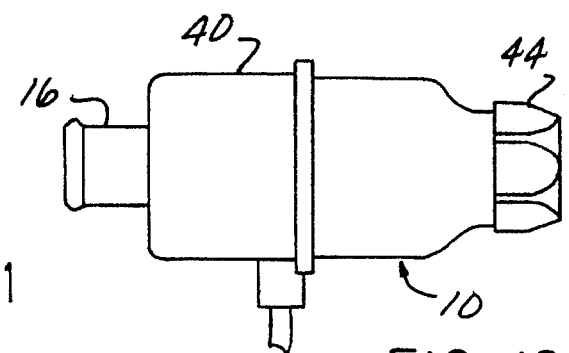
FIG. 12 is a side view of the check valve according to the first embodiment of the present invention with another alternative end effect configuration for the outlet connector.
Figure 13:
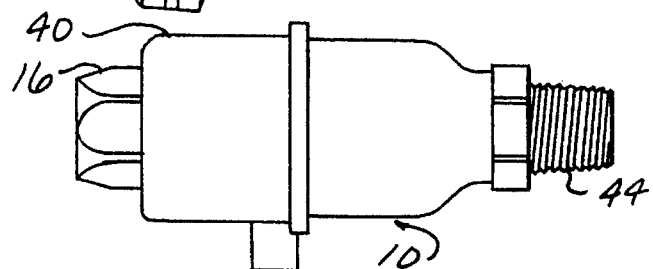
FIG. 13 is a side view of the check valve according to the first embodiment of the present invention with an alternative end effect for the inlet connector and an alternative end effect for the outlet connector.
Figure 14:
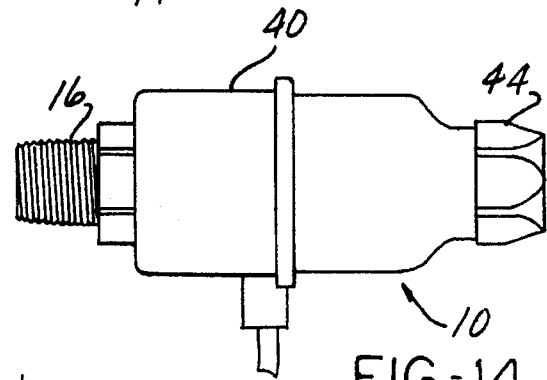
FIG. 14 is a side elevational view of the check valve according to the second embodiment of the present invention with an alternative end effect configuration for the inlet connector and an alternative end effect configuration for the outlet connector.

FIG. 8 is a side view of the check valve according to the first embodiment of the present invention having barbed tube end effects for the inlet 16 and the outlet 44. The barbed tube end effect is suitable for rubber hose clamp connector type applications. FIG. 8 illustrates a straight flow through configuration for the check valve as also illustrated in FIGS. 1 and 2. FIG. 9 is a side view of the check valve according to the first embodiment of the present invention with an alternative outlet 44 configuration. The outlet configuration illustrated in FIG. 9 provides for a 90° flow path through the check valve of the present invention. FIG. 10 is a side view of the check valve according to the first embodiment of the present invention with a third configuration for the outlet connector 44. In this configuration, a 135° flow path is provided through the check valve according to the present invention. The barbed tube end effect on the inlet 16 or the outlet 44 for the first embodiment of the invention as illustrated in FIGS. 8–10 can be replaced as desired with an inverted flare end effect for the inlet 16 and/or the outlet 44. FIG. 11 is a side view of the check valve according to the first embodiment of the present invention having a barbed tube end effect on the inlet 16 and a threaded male end effect for the outlet 44. The threaded male and female end effects preferably are formed with standard national pipe thread (NPT) male and/or female configurations as desired for the inlet 16 and/or outlet 44. An electrical connector 64 is also illustrated in FIG. 11 suitable for attachment to the control means 54 (shown in FIGS. 3 and 4). FIG. 12 is a side view of the check valve according to the first embodiment of the present invention having a barbed tube end effect for the inlet 16 and a threaded female end effect for the outlet 44. FIG. 13 is a side view of the check valve according to the first embodiment of the present invention having a threaded end effect for the inlet 16 and a threaded male end effect for the outlet 44. FIG. 14 is a side view of the check valve according to the first embodiment of the present invention with a threaded male end effect for the inlet 16 and a threaded female end effect for the outlet 44. The inlet 16 and outlet 44 for any of the embodiments disclosed herein can be of the same end effect configuration or can have different end effect configurations. The inlet 16 and outlets 44 can be selected as desired from any connector fitting known to those skilled in the art and in any orientation required for the particular application. The inlet 16 and outlet 44 may include a barbed tube end effect, an inverted flare end effect, a threaded male end effect and/or a threaded female end effect.

Figure 15:
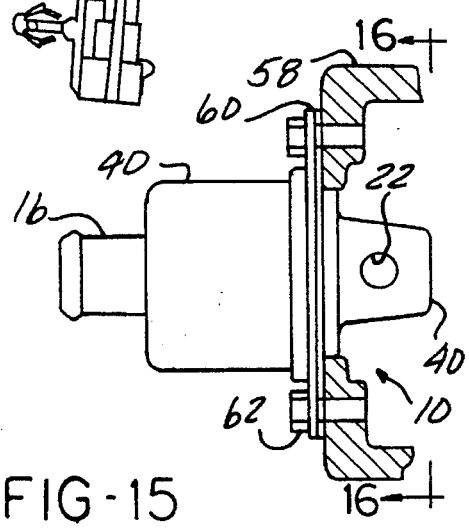
FIG. 15 is a cross-sectional view of the check valve according to the second embodiment of the present invention installed directly to a manifold.
Figure 16:
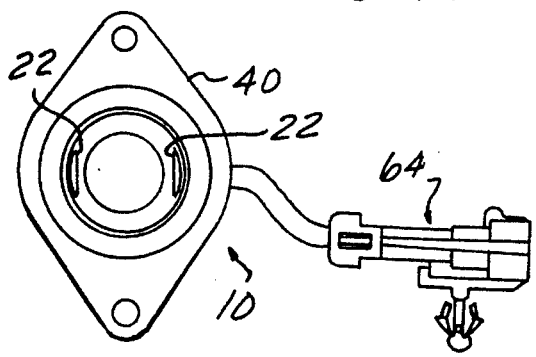
FIG. 16 is an end view of the check valve according to the second embodiment of the present invention taken as illustrated in FIG. 15 without illustrating the manifold.

FIG. 15 is a side view of the check valve according to the second embodiment of the present invention connected directly to a manifold 58 with the manifold 58 shown in cross-section. A gasket 60 is disposed between the manifold 58 and an outwardly extending flange of the body 40 of the check valve 10. The outwardly extending flange of the housing 40 of the check valve 10 is connected to the manifold 58 by threaded fasteners 62. The outlet 44 in this configuration corresponds to the aperture 22 formed in the housing 40 since no additional end effect or redirection of the outlet 44 is required. FIG. 16 is an end view of the check valve according to the second embodiment of the present invention taken as shown in FIG. 15. FIG. 16 also illustrates an electrical connector 64 suitable for attachment to the control means 54 (shown in FIGS. 3 and 4). The inlet connector 16 for the embodiment illustrated in FIGS. 15 and 16 can be of any suitable configuration or end effect. By way of example, and not limitation, the outlet 16 may have a barbed tube end effect, an inverted flare end effect, a threaded male end effect or a threaded female end effect.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A check valve for selectively preventing and allowing flow of fluid from an inlet to an outlet comprising:

a housing having an inlet and an outlet;

an elongated longitudinally extending wall within the housing defining a passage from the inlet and communicating with the inlet, the passage having an end cap opposite from the inlet, said end cap closing the passage, said passage having at least one longitudinally extending aperture in a sidewall of said passage adjacent to the end cap;

an inner sleeve slidably received within the passage for longitudinal movement therein between a first position closing the at least one aperture to fluid flow between the inlet and the outlet, and a second position opening the aperture to fluid flow between the inlet and the outlet;

biasing means for normally urging the sleeve toward one of the first and second positions; and actuating means for driving the sleeve toward the other of the first and second positions against the urging of said biasing means.

2. The check valve of claim 1 wherein said biasing means further comprises:

a first spring seat connected to said wall of said passage;

a second spring seat connected to said sleeve; and a valve return spring disposed within said passage having a first end abutting against said first spring seat and a second end abutting against said second spring seat for normally urging said sleeve toward one of said first and second positions.

3. The check valve of claim 1 wherein said actuating means further comprises:

a solenoid disposed with windings around said passage for urging said sleeve toward the other of said first and second positions against the urging of said biasing means in response to current flow through said solenoid.

4. The check valve of claim 1 further comprising:

said housing defining an enlarged baffle chamber surrounding said at least one aperture formed in said wall of said passage and connected to said passage, said housing formed in part by a radially extending sidewall for longitudinally retaining said actuating means.

5. The check valve of claim 1 further comprising:

a retainer clip connected to said wall of said passage, said clip spaced from said housing for longitudinally retaining said actuating means interposed between said clip and said housing.

6. A check valve for placement between an air pump and a manifold to prevent back flow of fluid from the manifold to the air pump comprising:

a housing having a longitudinal axis, an inlet and an outlet, said inlet having a first valve stop and a first radially inwardly extending spring seat connected to said inlet, said inlet defined in part by a longitudinally extending, elongated passage with a sidewall and an end cap connected to one end thereof, said sidewall having at least one aperture therethrough spaced longitudinally from said end cap, said end cap having a second valve stop formed thereon;

an elongated sleeve valve reciprocally disposed within said passage for longitudinal movement from a first position blocking communication between said inlet and outlet through said at least one aperture and a second position allowing communication between said inlet and outlet through said at least one aperture, said sleeve valve having a second annular spring seat extending radially inwardly adjacent an end of said sleeve valve engageable with said end cap;

spring biasing means disposed with opposite ends engaging said first and second spring seats for urging said sleeve valve toward one of said first and second positions; and solenoid means for electrically actuating movement of said sleeve valve from said one of said first and second positions to the other of said first and second positions in response to current flow through said solenoid means.

7. The check valve of claim 6 wherein said housing means comprises:

an elongated sleeve seat having open first and second ends and a sidewall with an inner cylindrical surface and an outer cylindrical surface and at least one aperture extending through said sidewall adjacent said first end, a portion of said outer cylindrical surface defining a stationary coil seat;

an inlet member connectible to an air pump and disposed sealingly engaged with said inner cylindrical surface of said sleeve seat defining a first sleeve valve shoulder stop and further having a first spring seat flared radially inwardly from said shoulder; and an outlet member connectible to a manifold and disposed sealingly engaged with said outer cylindrical surface of said sleeve seat to encircle said first end of said valve seat including said at least one aperture to define a buffer chamber, and at least a portion of said outlet member forming a radially outwardly extending retaining wall for said solenoid means.

8. The check valve of claim 6 wherein said spring biasing means further comprises:

a valve return spring disposed within said passage having a first end abutting against said first spring seat and a second end abutting against said second spring seat for normally urging said sleeve valve toward one of said first and second positions.

9. The check valve of claim 6 further comprising:

a solenoid disposed with windings around said passage for urging said sleeve valve toward the other of said first and second positions against the urging of said spring biasing means in response to current flow through said solenoid.

10. A check valve for selectively preventing and allowing flow of fluid from an inlet to an outlet comprising:

an elongated passage having a cylindrical sidewall, a first end and a second end, said cylindrical sidewall having at least one aperture adjacent said second end;

an inlet connector connected to said first end of said passage, said inlet connector in cooperation with said passage defining a first valve stop and a first spring seat;

an end cap connected to said second end of said passage, said end cap closing said second end of said passage and in cooperation with said passage defining a second valve stop;

a hollow inner sleeve valve having a longitudinal passage therethrough and slidably received within said elongated passage for longitudinal movement therein between a first position and a second position, said first position preventing fluid flow through said at least one aperture and said second position allowing fluid flow through said at least one aperture, a second spring seat connected to said sleeve valve;

a valve return spring disposed within said passage having a first end abutting against said first spring seat and a second end abutting against said second spring seat for normally urging said sleeve valve toward one of said first and second positions; and a solenoid disposed with windings around said passage for urging said sleeve valve toward the other of said first and second positions against the urging of said spring in response to current flow through said solenoid.

11. The check valve of claim 10 further comprising:

a housing means defining an enlarged baffle chamber surrounding said at least one aperture formed in said sidewall of said passage, said housing means connected to said passage, said housing means formed in part by a radially extending sidewall for longitudinally retaining said solenoid.

12. The check valve of claim 11 further comprising:

a retainer clip connected to said passage and spaced from said housing means for longitudinally retaining said solenoid interposed between said clip and said radially extending sidewall.

13. The check valve of claim 11 further comprising:

said housing means including an outlet connector connected to said housing in fluid communication with said baffle chamber.

14. A check valve for selectively preventing and allowing fluid flow between an inlet and an outlet comprising:

an elongated housing having an internal fluid passage extending between said inlet and outlet, said passage defined in part by at least one side wall extending parallel to a longitudinal axis of said housing forming a narrow passage portion communicating with an enlarged passage portion and at least one stationary intermediate aperture disposed between said inlet and outlet; and reciprocal means slidably sheathed within said narrow passage portion, said reciprocal means for carrying a valve seat engageable with said housing to substantially close said intermediate aperture when in a first position and to substantially open said intermediate aperture when in a second position, wherein said fluid flow passes through said reciprocal means along a generally linear path when said valve seat is moved away from said intermediate aperture.

15. The check valve of claim 14 further comprising:

a first spring seat connected to said side wall of said passage;

a second spring seat connected to said reciprocal means; and a valve return spring disposed within said passage having a first end abutting against said first spring seat and a second end abutting against said second spring seat for normally urging said reciprocal means toward one of said first and second positions.

16. The check valve of claim 15 further comprising:

a solenoid disposed with windings around said passage for urging said reciprocal means toward the other of said first and second positions against the urging of said valve return spring in response to current flow through said solenoid.

17. The check valve of claim 14 further comprising:

said valve seat having a high angle of attack to reduce pressure and vacuum effects on operation of said reciprocal means.

18. A check valve for selectively preventing and allowing fluid flow between an inlet and an outlet comprising:

an elongated housing having an internal fluid passage extending between said inlet and outlet, said passage defined in part by at least one side wall extending parallel to a longitudinal axis of said housing and at least one stationary intermediate aperture disposed between said inlet and outlet;

reciprocal means slidably received within said passage and for carrying a valve seat engageable with said housing to substantially close said intermediate aperture when in a first position and to substantially open said intermediate aperture when in a second position, wherein said fluid flow passes straight through said reciprocal means along a linear path when said valve seat is moved away from said intermediate aperture; and control means responsive to a change in position of said reciprocal means for selectively applying power to a fluid pump and for selectively regulating an amount of current supplied to operably position said reciprocal means in one of said first and second positions, said control means operable to apply power to said fluid pump only when said reciprocal means is in said second position and to reduce the amount of current applied to maintain said reciprocal means in said second position prior to applying power to said fluid pump.

19. The check valve of claim 18 further comprising:

said control means for operably supplying reduced current to said reciprocal means while said fluid pump operates, said control means for removing power from said fluid pump while simultaneously removing reduced current from said reciprocal means, such that said reciprocal means quickly returns to said first position after power is removed from said fluid pump while said fluid pump is spinning down.

20. A check valve for selectively preventing and allowing flow of fluid from an inlet to an outlet comprising:

an elongated housing having an inlet, an outlet and at least one intermediate, longitudinally extending, aperture between the inlet and the outlet;

an elongated longitudinally extending passage defined by at least one wall extending parallel to a longitudinal axis of said housing forming a narrow passage portion communicating with an enlarged passage portion, the elongated passage extending within the housing from the inlet and communicating with the inlet;

an elongated inner sleeve slidably sheathed within the narrow passage portion for longitudinal movement therein between a first position closing the at least one aperture to fluid flow between the inlet and the outlet, and a second position opening the at least one aperture to fluid flow between the inlet and the outlet;

biasing means for normally urging the sleeve toward one of the first and second positions; and actuating means for driving the sleeve toward the other of the first and second positions against the urging of said biasing means.

21. A check valve for selectively preventing and allowing fluid flow between an inlet and an outlet comprising:

an elongated housing having an internal fluid passage extending between said inlet and outlet, said passage defined in part by at least one side wall extending parallel to a longitudinal axis of said housing forming a narrow passage portion extending to protrude within an enlarged passage portion and at least one stationary intermediate aperture disposed between said inlet and outlet; and reciprocal means slidably sheathed within said narrow passage portion, said reciprocal means for carrying a valve seat engageable with said housing to substantially close said intermediate aperture when in a first position and to substantially open said intermediate aperture when in a second position, wherein said fluid flow passes through said reciprocal means along a generally linear path when said valve seat is moved away from said intermediate aperture.

* * * * *